H. Perkins,
Adjustable Seat,
N° 82,636.            Patented Sep. 29, 1868.
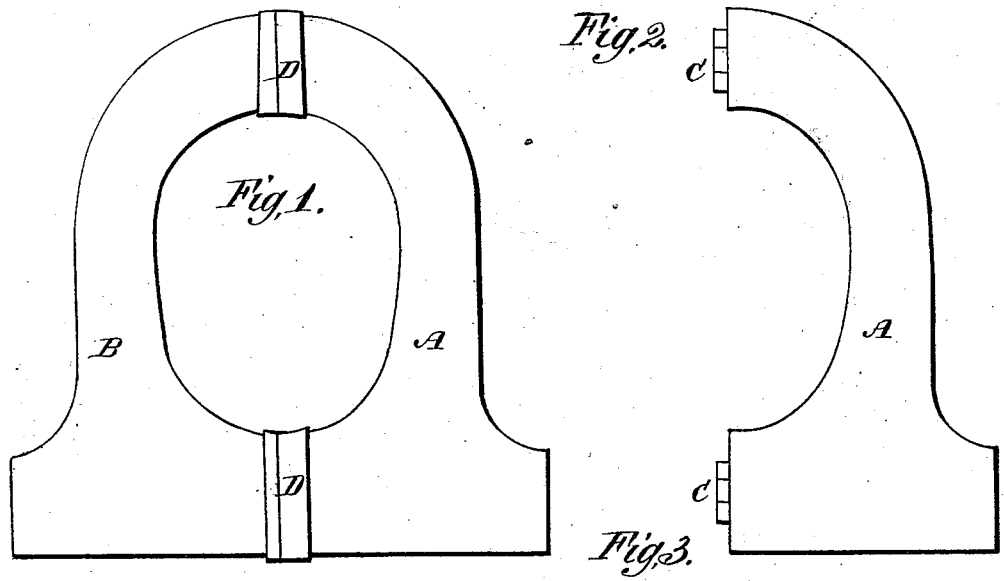
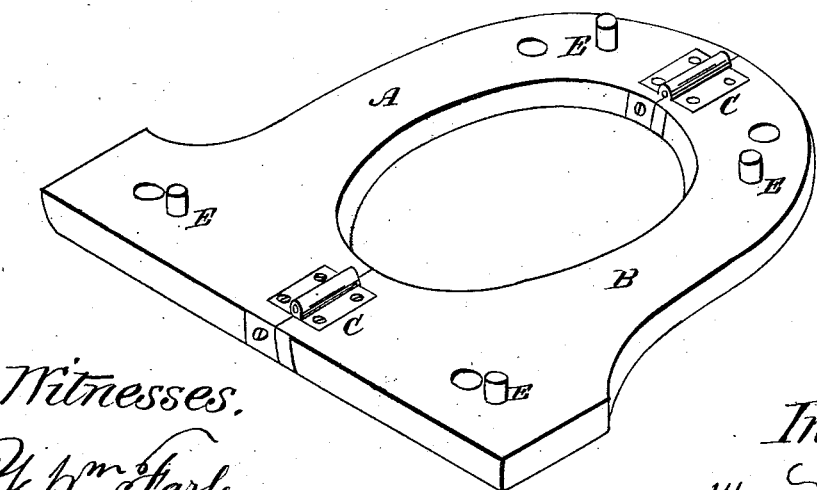
Witnesses.
P.K.W. Farley
N. Martin.
Inventor.
Howard Perkins.
by his Atty.
J.F. Reigart

United States Patent Office.

HOWARD PERKINS, OF MANSFIELD, ASSIGNOR TO HIMSELF AND BENJAMIN S. LEONARD, OF SHARON, MASSACHUSETTS.

Letters Patent No. 82,636, dated September 29, 1868.

IMPROVEMENT IN PORTABLE ADJUSTABLE ELASTIC SEAT.

The Schedule referred to in these Letters Patent and making part of the same.

TO ALL WHOM IT MAY CONCERN:

Be it known that I, HOWARD PERKINS, of Mansfield, county of Bristol, and State of Massachusetts, have invented a new and useful Portable, Adjustable, and Elastic Seat for Seed-Planters, Cultivators, &c.; and I do hereby declare the following to be an exact description thereof, reference being had to the accompanying drawings, and to the letters of reference marked thereon, making a part of this specification, in which—

Figure 1 represents a top view of the seat that is intended as a movable or supplementary seat.

Figure 2 shows the same folded together.

Figure 3 exhibits the under side view of the same, with its hinges and elastic feet or springs.

The nature of my invention consists in the construction of a supplementary seat, that is portable, adjustable, elastic, and of any suitable material, to be applied and used as a driver's seat, upon seed-planters, cultivators, plows, &c., and may be used as a carriage or chair-seat.

This supplementary seat is oval in shape in front, and square behind, with an oval aperture in the centre, and is composed of two or more pieces, A and B, so as to be folded together in the smallest compass possible to be conveniently carried in a coat-pocket, and, where the hinges C are placed, the joint is covered by a shield, D, so as to be a safe and closely-covered joint.

On the lower side of this seat are springs or elastic feet, E, fastened firmly into the seat, so as to rest upon any platform or chair-seat, and allow a free passage of air under the seat, to keep the body healthy and cool, and prevent the ill effects produced by the use of cushions, and therefore much more comfortable and serviceable than cushions.

What I claim as my invention, and desire to secure by Letters Patent, is—

The construction of the elastic supplementary seat, with its hinges C, shields D, and elastic feet E, combined as herein described, and for the purposes set forth.

HOWARD PERKINS.

Witnesses:
J. FRANKLIN REIGART,
EDM. F. BROWN.